US011315568B2

(12) United States Patent
Hewitt et al.

(10) Patent No.: US 11,315,568 B2
(45) Date of Patent: Apr. 26, 2022

(54) SUMMARIZING MULTI-MODAL CONVERSATIONS IN A MULTI-USER MESSAGING APPLICATION

(71) Applicant: International Business Machines Corporation, Armonk, NY (US)

(72) Inventors: Trudy L. Hewitt, Cary, NC (US); Liam S. Harpur, Skerries (IE); Jonathan D. Dunne, Dungarvan (IE); Kelley Anders, East New Market, MD (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 193 days.

(21) Appl. No.: 16/896,611

(22) Filed: Jun. 9, 2020

(65) Prior Publication Data
US 2021/0383799 A1 Dec. 9, 2021

(51) Int. Cl.
*G10L 15/22* (2006.01)
*G10L 15/08* (2006.01)
(Continued)

(52) U.S. Cl.
CPC .............. *G10L 15/22* (2013.01); *G06F 3/167* (2013.01); *G06F 40/58* (2020.01); *G06N 20/00* (2019.01);
(Continued)

(58) Field of Classification Search
USPC ............................................. 704/9, 257, 270
See application file for complete search history.

(56) References Cited

U.S. PATENT DOCUMENTS

| 7,487,453 | B2 | 2/2009 | Goebel et al. |
| 7,738,778 | B2 | 6/2010 | Agnihotri et al. |

(Continued)

FOREIGN PATENT DOCUMENTS

| JP | 2013167985 A | 8/2013 |
| JP | 2015001834 A | 1/2015 |
| WO | 2019100350 A1 | 5/2019 |

OTHER PUBLICATIONS

Liu et al., "Text summarization with TensorFlow", Google AI Blog, Aug. 24, 2016, https://ai.googleblog.com/2016/08/text-summarization-with-tensorflow.html.
(Continued)

*Primary Examiner* — Leonard Saint Cyr
(74) *Attorney, Agent, or Firm* — Garg Law Firm, PLLC; Rakesh Garg; Michael O'Keefe

(57) ABSTRACT

An embodiment of a summarization application divides collected conversation data into media and text components. The application implements respective machine learning mechanisms to enhance modeling operations of the text and media components to identify key elements from the conversation. The application generates a headline banner from a group of key elements based on an analysis involving first predetermined criteria. The application also combines additional key elements to the group of key elements to form a second group of key elements. The application generates a summary from the second group of key elements based on a second analysis involving second predetermined criteria. The application presents, via a display, the headline banner according to a first output of the first key element analysis and the summary according to a second output of the second key element analysis.

20 Claims, 15 Drawing Sheets

(51) Int. Cl.
  *H04L 51/00* (2022.01)
  *G06N 20/00* (2019.01)
  *G06F 40/58* (2020.01)
  *G06F 3/16* (2006.01)

(52) U.S. Cl.
  CPC .............. *G10L 15/08* (2013.01); *H04L 51/16* (2013.01); *G10L 2015/223* (2013.01)

(56) References Cited

U.S. PATENT DOCUMENTS

| | | |
|---|---|---|
| 8,495,658 B2 | 7/2013 | Zakon et al. |
| 9,116,984 B2 | 8/2015 | Caldwell et al. |
| 9,576,276 B2 | 2/2017 | Stern et al. |
| 9,720,979 B2 | 8/2017 | Dhara et al. |
| 9,972,356 B2 | 5/2018 | Shynar et al. |
| 2011/0071973 A1* | 3/2011 | Zhang .................. G06F 16/313 706/54 |
| 2013/0226844 A1* | 8/2013 | Zhang .................. G06F 16/313 706/59 |
| 2016/0041985 A1* | 2/2016 | Manterach .............. G06F 16/93 707/727 |
| 2017/0213130 A1* | 7/2017 | Khatri .................. G06N 3/0445 |
| 2019/0005024 A1 | 1/2019 | Somech et al. |
| 2019/0122766 A1 | 4/2019 | Strader et al. |
| 2020/0226216 A1* | 7/2020 | Marin ...................... G06F 40/30 |
| 2021/0357786 A1* | 11/2021 | Shibata .................. G06N 20/00 |

OTHER PUBLICATIONS

Fan et al., "Controllable Abstractive Summarization", Facebook Research, Jul. 20, 2018, https://research.fb.com/publications/controllable-abstractive-summarization/.

Feigenblat, "Unsupervised automatic document summarization", Artificial Intelligence Conference, Oct. 11, 2018, https://conferences.oreilly.com/artificial-intelligence/ai-eu-2018/public/schedule/detail/70274.

* cited by examiner

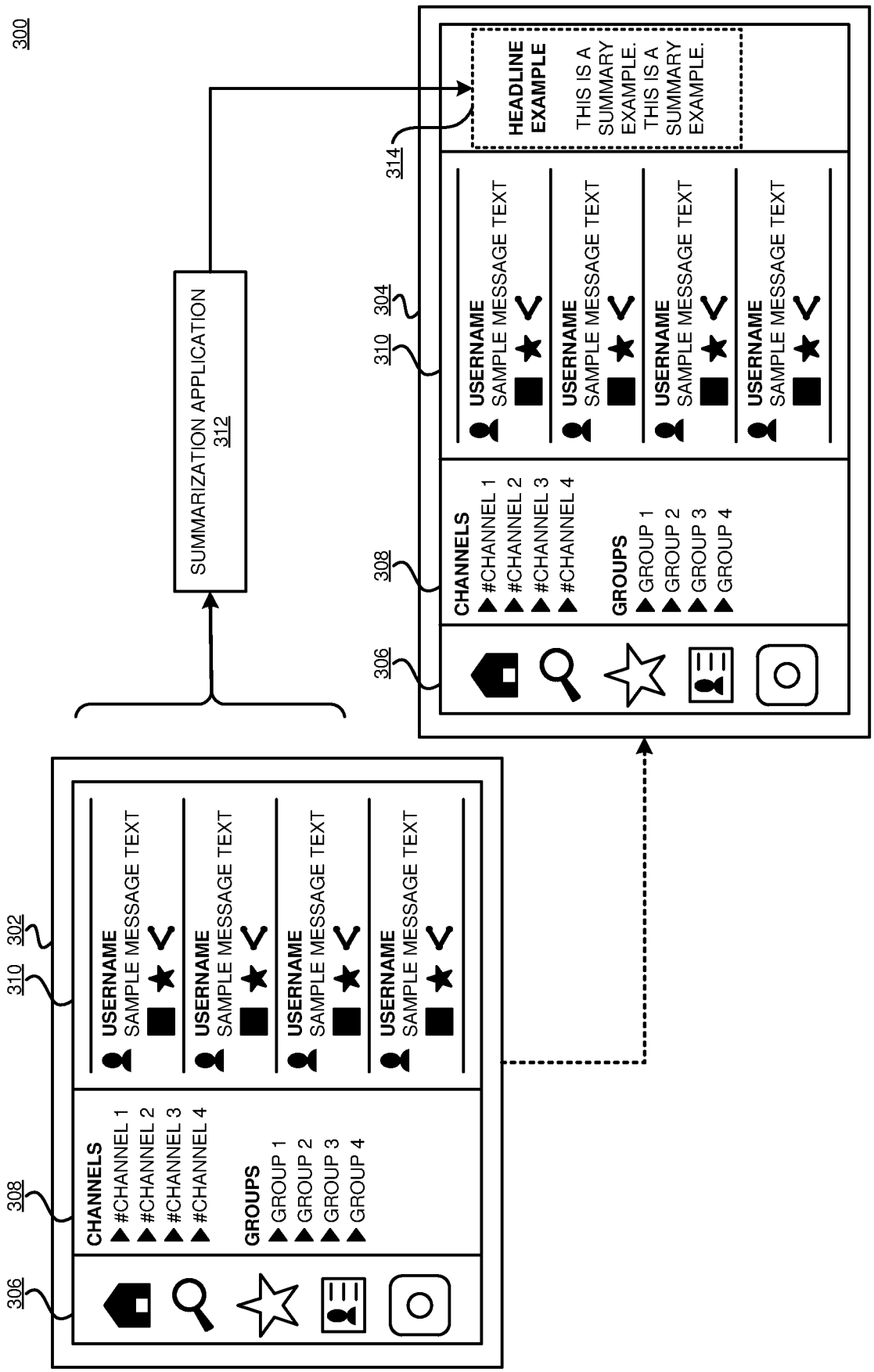

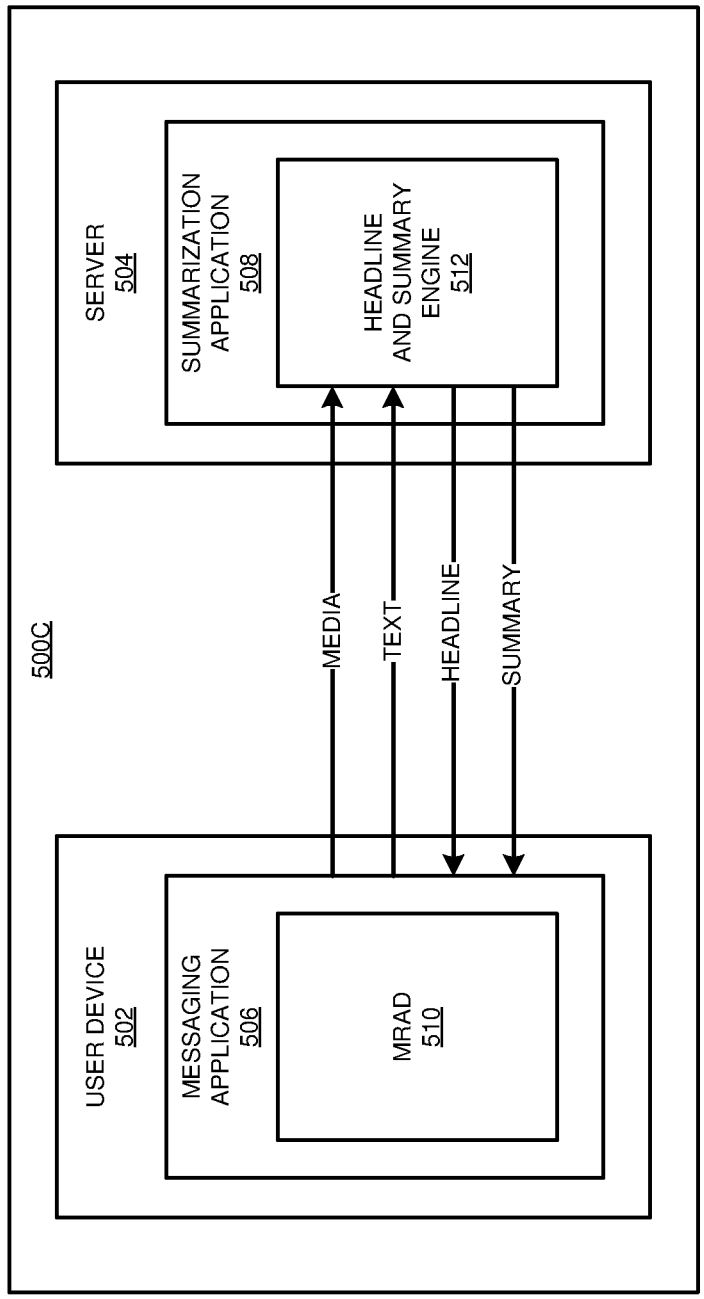

SUMMARIZING MULTI-MODAL CONVERSATIONS IN A MULTI-USER MESSAGING APPLICATION

BACKGROUND

The present invention relates generally to a method, system, and computer program product for messaging applications. More particularly, the present invention relates to a method, system, and computer program product for summarizing multi-modal conversations in a multi-user messaging application.

A variety of messaging applications are in common use today that allow for real-time or near real-time exchange of text-based messages. These include applications referred to as chatting, Instant Messaging (IM), and texting using Short Message Service (SMS). Many messaging applications now also allow more than just text-based communications. For example, many messaging applications include a Multimedia Messaging Service (MMS) or Enhanced Message Service (EMS) that extend the basic text-based exchange technology to allow for the exchange of a variety of media, including video, images, and audio.

Messaging applications typically organize messages into messaging groups or conversations. A user can create a new group or conversation by selecting another user or group of users, sometimes referred to as contacts, with which to initiate a conversation. Once initiated, the messaging application provides a dedicated conversation window for communications among the members of the selected group. Messaging applications typically continue in this fashion, creating new conversation windows for each unique combination of users. Messaging applications typically include a view of multiple past and ongoing conversations identified by group names or the name of one or more users in the conversation. Over time, a user will often accumulate a long list of such conversations in the messaging application.

SUMMARY

The illustrative embodiments provide for summarizing multi-modal conversations in a multi-user messaging application. An embodiment includes dividing collected real-time conversation data of a conversation thread into a media component and a text component. The embodiment also includes implementing a first machine learning mechanism to enhance a first topic modeling operation of the text component of the collected real-time conversation data to identify key words associated with the conversation thread. The embodiment also includes implementing a second machine learning mechanism to enhance a second topic modeling operation of the media component of the collected real-time conversation data to identify key terms associated with the conversation thread. The embodiment also includes combining the key words and key terms into a first group of key elements. The embodiment also includes generating a headline banner from the first group of key elements, wherein the headline banner includes key elements selected from the first group of key elements based on a first analysis involving first predetermined criteria. The embodiment also includes combining additional key words from the first machine learning mechanism and additional key terms from the second machine learning mechanism with the first group of key elements to form a second group of key elements. The embodiment also includes generating a summary from the second group of key elements, wherein the summary includes key elements selected from the second group of key elements based on a second analysis involving second predetermined criteria. The embodiment also includes presenting, via a display, the headline banner according to a first output of the first key element analysis and the summary according to a second output of the second key element analysis. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example messaging application summarization environment in accordance with an illustrative embodiment;

FIG. 5C depicts a block diagram of an example arrangement for providing functionality described herein that can be utilized with a summarization application in accordance with illustrative embodiments;

DETAILED DESCRIPTION

Figure 1:
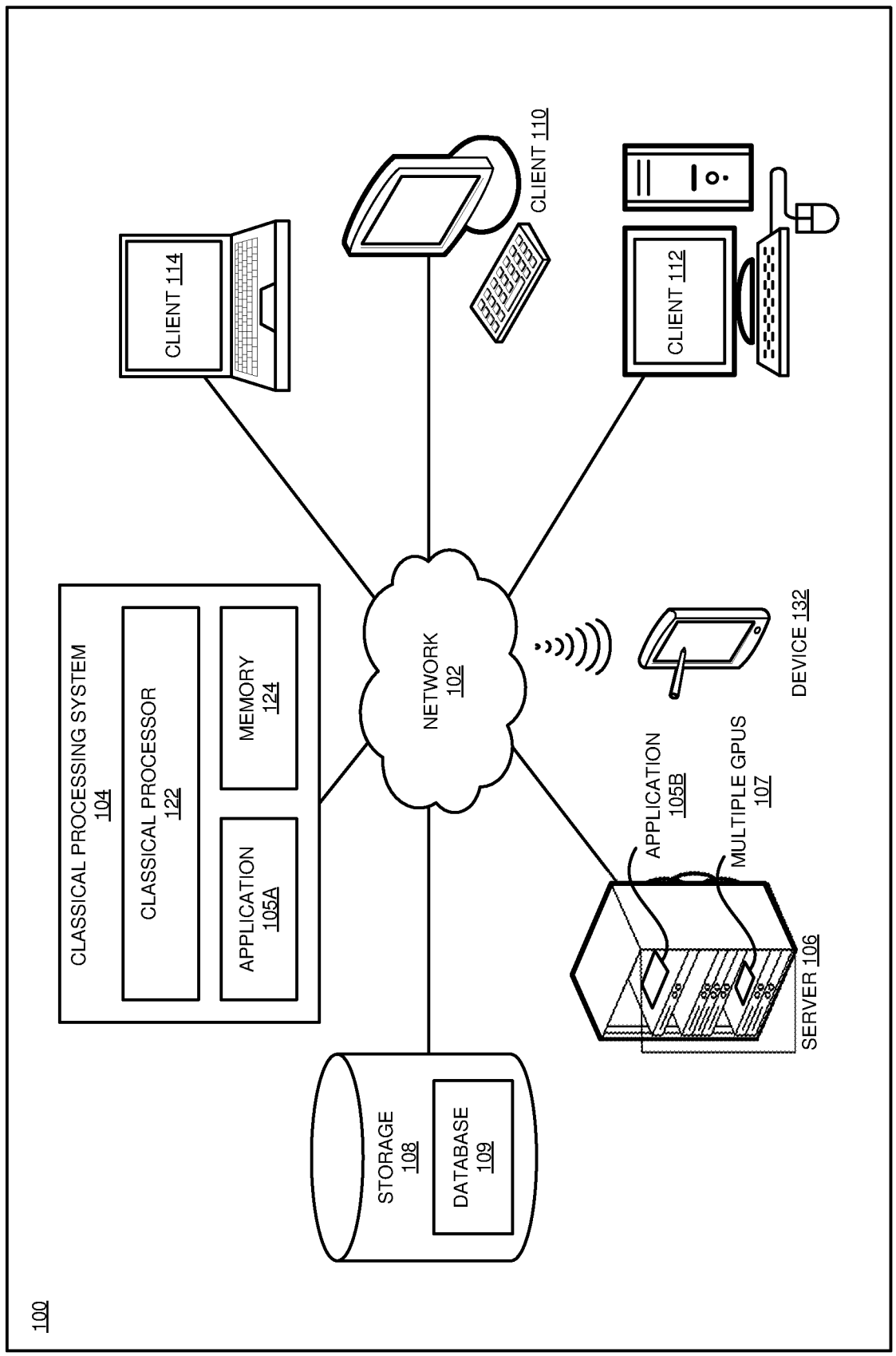
FIG. 1 depicts a block diagram of a network of data processing systems in which illustrative embodiments may be implemented.

Messaging applications allow users to communicate over a computer network using a graphical user interface (GUI) that organizes messages into conversations. Users can create new conversations that involve a select group of users. Some messaging applications also allow users to create new conversations, or automatically create new conversations, based on other criteria, such as a keyword or hashtag. Some messaging applications also include conversations in the form of channels or chat rooms that allow users to be added and removed.

Over time, a user can accumulate numerous conversations in a messaging application. A messaging application will typically include a list view of the user's conversations. The conversation list view may include a group name, channel name, or the name of one or more users, and a most recent message in the conversation. When a user selects a conversation from the conversation list view, the user can see some number of most recent messages in the conversation. However, this information does not provide a reliable indication of the main topic being discussed in each conversation. In addition, messaging applications often include informal or off-topic comments and media elements. This leaves the user to select and scan through messages of each conversation to get an understanding of the main topics being discussed. This can be particularly time-consuming for users of messaging applications that include numerous active users and conversations.

The illustrative embodiments recognize that artificial intelligence technologies can be used to identify a topic of conversation for purely text-based content. For example, natural language processing (NLP) technology can be used to analyze a segment of text and identify a topic of the text segment. However, NLP analysis does not account for the contributions that various media elements make to a conversation. As broadband network and Internet connections continue to become more common, media elements can be more easily transmitted between users. As a result, messaging applications often include conversations that include numerous media elements that provide meaningful contributions to a conversation. Therefore, the use of an NLP technology alone does not consistently provide accurate results.

Illustrative embodiments address these problems by providing a summarization application that divides collected conversation data into media and text components. The application implements respective machine learning mechanisms to enhance modeling operations of the text and media components to identify key elements from the conversation. The application generates a headline banner from a group of key elements based on an analysis involving first predetermined criteria. The application also combines additional key elements to the group of key elements to form a second group of key elements. The application generates a summary from the second group of key elements based on a second analysis involving second predetermined criteria. The application presents, via a display, the headline banner according to a first output of the first key element analysis and the summary according to a second output of the second key element analysis.

In some embodiments, a messaging application generates a first computer-generated user interface that includes a navigation menu, a conversation list, and a conversation view. In the illustrated embodiment, a summarization application receives messages in the form of real-time or near real-time conversation data and responds with provides a headline banner and a summary from the conversation data. In some such embodiments, the messaging application receives the headline banner and summary, and adjusts the user interface by generating a user interface that includes a summary panel that displays the headline banner and summary.

In some embodiments, a user device has a messaging application installed that communicates over a network with a server that hosts the summarization application. In some embodiments, the messaging application generates a user interface and allows a user to transmit and receive messages with other users communicating over a network. In some embodiments, the messaging application transmits these messages to the summarization application. In some embodiments, the messaging application relays the messages in real-time or near real-time to the summarization application as they are received by the messaging application. In other embodiments, the messaging application transmits messages in batches to the summarization application automatically, for example according to a pre-established schedule or other criteria. In other embodiments, the messaging application transmits messages in batches to the summarization application in response to a command input from a user.

In some embodiments, a summarization application receives messages from the messaging application and processes the messages to generate a headline and a summary. The summarization application then transmits the headline and summary back to the messaging application. In some embodiments, the summarization application transmits the headline to the messaging application while the summarization application is still generating the summary. In other embodiments, the summarization application delays transmitting the headline to the messaging application until the summarization application has completed generating the summary, at which point the summarization application transmits the headline and summary together to the messaging application. In some embodiments, the process of receiving messages from the messaging application and responding with transmissions of headlines/headline updates and summaries/summary updates is an ongoing process that results in numerous revisions and refinements to the headline and summary being provided to the messaging application.

In some embodiments, the server also serves as a messaging server that hosts a server-side application for relaying messages to and from the messaging application on the user device that are directed to or received from other user devices. In other embodiments, the server-side application is hosted on a separate server while the server hosts the summarization application.

In some embodiments, a server-side messaging application relays messages to and from the messaging application on the user device that are directed to or received from other user devices. In some such embodiments, the server-side messaging application also transmits the messages to the summarization application on server. In some such embodiments, the server-side messaging application relays the messages in real-time or near real-time to the summarization application as they are received for transmission to and from the messaging application. In other embodiments, the server-side messaging application transmits messages in batches to the summarization application automatically, for example according to a pre-established schedule or other criteria. In other embodiments, the server-side messaging application transmits messages in batches to the summarization application in response to a command input from the user via the messaging application that causes the user device to transmit the command to the server-side messaging application.

In some embodiments, a summarization application receives messages from the server-side messaging application and processes the messages to generate a headline and a summary. The summarization application then transmits the headline and summary back to the server-side messaging application, which in turn transmits the headline and summary to the messaging application. In some embodiments, the summarization application transmits the headline to the server-side messaging application while the summarization application is still generating the summary. In other embodiments, the summarization application delays transmitting the headline to the server-side messaging application until the summarization application has completed generating the summary, at which point the summarization application transmits the headline and summary together to the server-side messaging application. In some embodiments, the process of receiving messages from the server-side messaging application and responding with transmissions of headlines/headline updates and summaries/summary updates is an ongoing process that results in numerous revisions and refinements to the headline and summary being provided to the messaging application via the server-side messaging application from the summarization application.

In some embodiments, a user device has a messaging application installed that communicates over a network with a server that hosts the summarization application. In some embodiments, the messaging application generates a user interface and allows a user to transmit and receive messages with other users communicating over a network, where the messages may include two or more modalities, for example a text component and a media component, where the media component may include various types of multimedia, such as images, audio, and video. The messaging application transmits the multi-modal messages to the summarization application. In the illustrated embodiment, the summarization application comprises a modality recognition and division MRAD module for dividing the input message stream into two modalities, referred to hereafter as a text component and a media component. In some embodiments, the MRAD module comprises modules for identifying and distinguishing the textual portions of the message stream from the media components. For example, in some embodiments, the MRAD module comprises a story segment identifier SSI module for recognizing and outputting video elements, an audio identifier AI module for identifying and outputting audio elements, and a text identifier TI module for identifying and outputting the text components.

In some embodiments, the summarization application comprises a headline and summary engine that receives the separate text and media components of the messages from the messaging application and processes text and media components of the messages to generate a headline and a summary. The headline and summary engine then transmits the headline and summary back to the messaging application. In some embodiments, the headline and summary engine transmits the headline to the messaging application while the headline and summary engine is still generating the summary. In other embodiments, the headline and summary engine delays transmitting the headline to the messaging application until the headline and summary engine has completed generating the summary, at which point the headline and summary engine transmits the headline and summary together to the messaging application. In some embodiments, the process of receiving messages from the messaging application and responding with transmissions of headlines/headline updates and summaries/summary updates is an ongoing process that results in numerous revisions and refinements to the headline and summary being provided to the messaging application.

In some embodiments, the MRAD is installed on the user device rather than on the server. Thus, in some embodiments, the summarization application includes a client-side application that includes the MRAD. In some such embodiments, the messaging application generates a user interface and allows a user to transmit and receive messages with other users communicating over a network, where the messages may include two or more modalities, for example a text component and a media component, where the media component may include various types of multimedia, such as images, audio, and video. In some such embodiments, the messaging application transmits the multi-modal messages to the client-side MRAD. In alternative embodiments, the client-side MRAD receives at least some of the multi-modal messages directly from a server-side component of the messaging application.

In some embodiments, the user device comprises the MRAD module for dividing the input message stream into at least two modalities, referred to hereafter as a text component and a media component. In some embodiments, the MRAD module comprises modules for identifying and distinguishing the textual portions of the message stream from the media components. For example, in some embodiments, the MRAD module comprises a story segment identifier SSI module for recognizing and outputting video elements, an audio identifier AI module for identifying and outputting audio elements, and a text identifier TI module for identifying and outputting the text components.

In some embodiments, the summarization application comprises a headline and summary engine that receives the separate text and media components of the messages from the MRAD on the user device and processes the text and media components of the messages to generate a headline and a summary. The headline and summary engine then transmits the headline and summary back to the messaging application. In some embodiments, the headline and summary engine transmits the headline to the messaging application while the headline and summary engine is still generating the summary. In other embodiments, the headline and summary engine delays transmitting the headline to the messaging application until the headline and summary engine has completed generating the summary, at which point the headline and summary engine transmits the headline and summary together to the messaging application. In some embodiments, the process of receiving messages from the messaging application and responding with transmissions of headlines/headline updates and summaries/summary updates is an ongoing process that results in numerous revisions and refinements to the headline and summary being provided to the messaging application.

In some embodiments, the MRAD is a module of the messaging application installed on the user device rather as a stand-alone client-side application or installed on the server. Thus, in some embodiments, the messaging application includes an MRAD. In some such embodiments, the messaging application generates a user interface and allows a user to transmit and receive messages with other users communicating over a network, where the messages may include two or more modalities, for example a text component and a media component, where the media component may include various types of multimedia, such as images, audio, and video. In some such embodiments, the messaging application uses the MRAD to process the multi-modal messages into separate text and media components prior to transmitting them to the server. In some embodiments, the MRAD module comprises modules for identifying and distinguishing the textual portions of the message stream from the media components. For example, in some embodiments, the MRAD module comprises a story segment identifier SSI module for recognizing and outputting video elements, an audio identifier AI module for identifying and outputting audio elements, and a text identifier TI module for identifying and outputting the text components.

In some embodiments, the summarization application comprises a headline and summary engine that receives the separate text and media components of the messages from the MRAD on the user device and processes the text and media components of the messages to generate a headline and a summary. The headline and summary engine then transmits the headline and summary back to the messaging application. In some embodiments, the headline and summary engine transmits the headline to the messaging application while the headline and summary engine is still generating the summary. In other embodiments, the headline and summary engine delays transmitting the headline to the messaging application until the headline and summary engine has completed generating the summary, at which point the headline and summary engine transmits the headline and summary together to the messaging application. In some embodiments, the process of receiving messages from the messaging application and responding with transmissions of headlines/headline updates and summaries/summary updates is an ongoing process that results in numerous revisions and refinements to the headline and summary being provided to the messaging application.

In some embodiments, the summarization application also comprises an image classifier module, a text analysis module, a headline generator, and a combined element summary generator. In some such embodiments, a media component and text component are output from the MRAD module to the image classifier module and the text analysis module, respectively. The image classifier module and the text analysis module comprise respective machine-learning models for identifying key elements from the message stream received from a messaging application. The key elements are output to the headline generator and the summary generator, where they are used to generate a headline and summary associated with one or more topics of the message stream. In some embodiments, one or both of the headline generator and summary generator consider user preferences when generating the headline/summary. In some such embodiments, the summarization application further comprises a user preference database that stores one or more user preferences for one or more users. In some such embodiments, one or both of the headline generator and summary generator has access to the stored user preference s for use in generating and headline and/or summary.

In alternative embodiments, the summarization application can include some or all of the functionality described herein but grouped differently into one or more systems or modules. In some embodiments, the functionality described herein is distributed among a plurality of systems, which can include combinations of software and/or hardware-based systems, for example Application-Specific Integrated Circuits ASICs, computer programs, or smart phone applications. For example, in alternative embodiments, the user preference database is located on a user device, such as user device of Figure, rather than as part of the summarization application.

In some embodiments, the text analysis module collects some amount of conversation data from the message stream and implements a machine-learning mechanism to enhance a topic modeling operation for text analysis of the text component of collected real-time conversation data to identify key words associated with the conversation data. In some embodiments, the image classifier collects some amount of conversation data from the message stream and implements a machine-learning mechanism to enhance a topic modeling operation for image classification of the media component of collected real-time conversation data to identify key terms associated with the conversation data. In some embodiments, the outputs from the image classifier module and text analysis module are input to the headline generator and the summary generator.

In some embodiments, the headline generator combines the key words from the text analysis module and the key terms from the image classifier module into a first group of key elements. In some such embodiments, the headline generator generates a headline banner from the first group of key elements. In some such embodiments, the headline banner includes key elements selected from the first group of key elements based on an analysis involving predetermined criteria.

In some embodiments, the summary generator combines key words from the text analysis module and the key terms from the image classifier module into a second group of key elements. In some such embodiments, the summary generator generates a summary from the second group of key elements. In some such embodiments, the summary includes key elements selected from the second group of key elements based on an analysis involving predetermined criteria. In some embodiments, the summary generator uses additional key words and key terms that are associated with conversation data from the message stream generated over some pre-established amount of time or some amount of time selected based on some criteria. For example, in some embodiments, the summary generator receives the headline generated by the headline generator and calculates a coherence score using known methods. For example, in some such embodiments, the coherence score is a measure of a degree of semantic similarity between the headline and high scoring highly relevant words in the summary.

In some embodiments, the headline generator and/or the summary generator considers user preferences while generating a headline/summary. For example, in some embodiments, the headline generator and/or the summary generator accumulates and stores a number of key elements based at least in part on a user preference or setting that allows a user to impose some control over the size of the corpus and the severity of the data sparsity of the corpus, which can influence the accuracy of the headline and summary. In some embodiments, the headline generator and/or the summary generator accumulates and stores a number of key elements based at least in part on a complexity score calculated according to known methods, for example based on the linguistic difficulty of the topic, where a summary or headline becomes more accurate as the size of the corpus increases particularly due to the difficult nature of the topic of discussion.

In some embodiments, the text analysis module includes message data memory and a machine learning module that includes a topic model. In some such embodiments, the message data memory receives the text component of message data and accumulates message data. In some embodiments, the machine learning module receives message data from the message data memory and uses a topic model to detect a topic and key terms from the words in the message data. For example, in some embodiments, the topic model is a Biterm Topic Model or a Latent Dirichlet Allocation (LDA) model, although the Biterm topic model is preferred for a smaller corpus. In some embodiments, the text analysis module uses a set of features and machine learning techniques to generate a model. In some such embodiments, the model may be built once and can be used to identify acronyms and abbreviations in any body of text. Text can be a natural language question or passage, of any text in a document.

In some embodiments, the image classifier module includes message data memory and a machine learning module that includes a classification model. In some such embodiments, the message data memory receives the media component of message data and accumulates message data. In some embodiments, the machine learning module receives message data from the message data memory and uses a classification model to detect a topic and key terms from the media elements in the message data. For example, in some embodiments, the classification model is a known regression filter or a supervised or unsupervised classifier. In some such embodiments, the model may be built once and can be used to classify images and other media elements.

In some embodiments, the headline generator includes a key element buffer and a user profile filter. In some such embodiments, the key element buffer receives the key words and key terms from a text analysis module and image classifier module, respectively, for example the text analysis module and image classifier module of Figure. In some embodiments, the headline generator includes one or more filters, constraints, and/or ranking modules to derive a headline from the key elements that are made up of the key words and key terms. In some embodiments, the headline generator includes a user profile filter that has access to user preferences and uses one or more user preferences to filter key elements so as to derive a headline.

In some embodiments, the summary generator includes a key element buffer and a user profile filter. In some such embodiments, the key element buffer receives the key words and key terms from a text analysis module and image classifier module, respectively, for example the text analysis module and image classifier module of Figure. In some embodiments, the summary generator includes one or more filters, constraints, and/or ranking modules to derive a summary from the key elements that are made up of the key words and key terms. In some embodiments, the summary generator includes a user profile filter that has access to user preferences and uses one or more user preferences to filter key elements so as to derive a summary.

In some embodiments, the summary generator includes a coherence filter that receives the output from the user profile filter, accumulated key elements in a key element memory, and receives a headline from a headline memory. In some embodiments, the coherence filter receives the headline generated by the headline generator and calculates a coherence score using known methods. For example, in some such embodiments, the coherence score is a measure of a degree of semantic similarity between the headline and high scoring highly relevant words in the summary. In some embodiments, the summary generator uses the coherency score to determine whether the summary is complete, or if a larger corpus is needed from the key element memory to generate an accurate summary.

In some embodiments, the summary generator is similar to the summary generator in that it includes a key element buffer and a user profile filter where the key element buffer receives and buffers key words and key terms, and the user profile filter that receives the buffered key words and terms and filters them based on user preferences to derive a summary. The summary generator also includes a coherence filter that receives the output from the user profile filter, accumulated key elements in a key element memory, and a headline from a headline memory, and calculates a coherence score as a measure of a degree of semantic similarity between the headline and high scoring highly relevant words in the summary. In some embodiments, the summary generator uses the coherency score to determine whether the summary is complete, or if a larger corpus is needed from the key element memory to generate an accurate summary.

In some embodiments, the summary generator further comprises a hyperlink generator that receives a summary output from the coherence filter. In some embodiments, the summary generator provides summarization sub-levels where a summary can include sub-summaries where more in-depth summaries are hyperlinked and available via the user interface, so that a user has the ability to expand or collapse sections or topics that may be of relevance. In some such embodiments, a learning corpus is leveraged to identify frequency of when the sub-content is viewed and determine if the main summary should be expanded to include the sub-content for future viewing. Thus, in some embodiments, the summary generator can also receive data representative of statistics indicating number and/or frequency of views and use that data to determine if a sub-summary should be merged with a main summary.

In some embodiments, the summary generator uses the summary combined with additional incoming conversation data to update the summary and/or add a sub-summary. In some embodiments, the summary data is output to the user for display, and it is also fed back as an input to the user profile filter. Alternatively, the summary generator can store the summary in memory and the user profile accesses the summary from memory for generating an updated summary or sub-summary. In some embodiments, the sub-summary is output through the hyperlink generator, which is displayed with the summary.

In some embodiments, the hyperlink provides statistics to the summary generator indicating view statistics for corresponding sub-summaries. In some embodiments, if the sub-summary views reach a predetermined threshold, the summary generator generates a new summary to replace the summary at the user's device that includes the content of the sub-summary. Alternatively, the user's device or messaging application handles the merging of a sub-summary with a summary if the threshold number of views is reached. In some embodiments, the summary generator generates further sub-summaries and/or summaries that continue down deeper layers, i.e., sub-sub-summaries, sub-sub-sub-summaries, etc. In some such embodiments, the summary generator uses summary content from existing summaries and conversation data that has been generated since those summaries were generated to generate updated summaries or sub-summaries.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
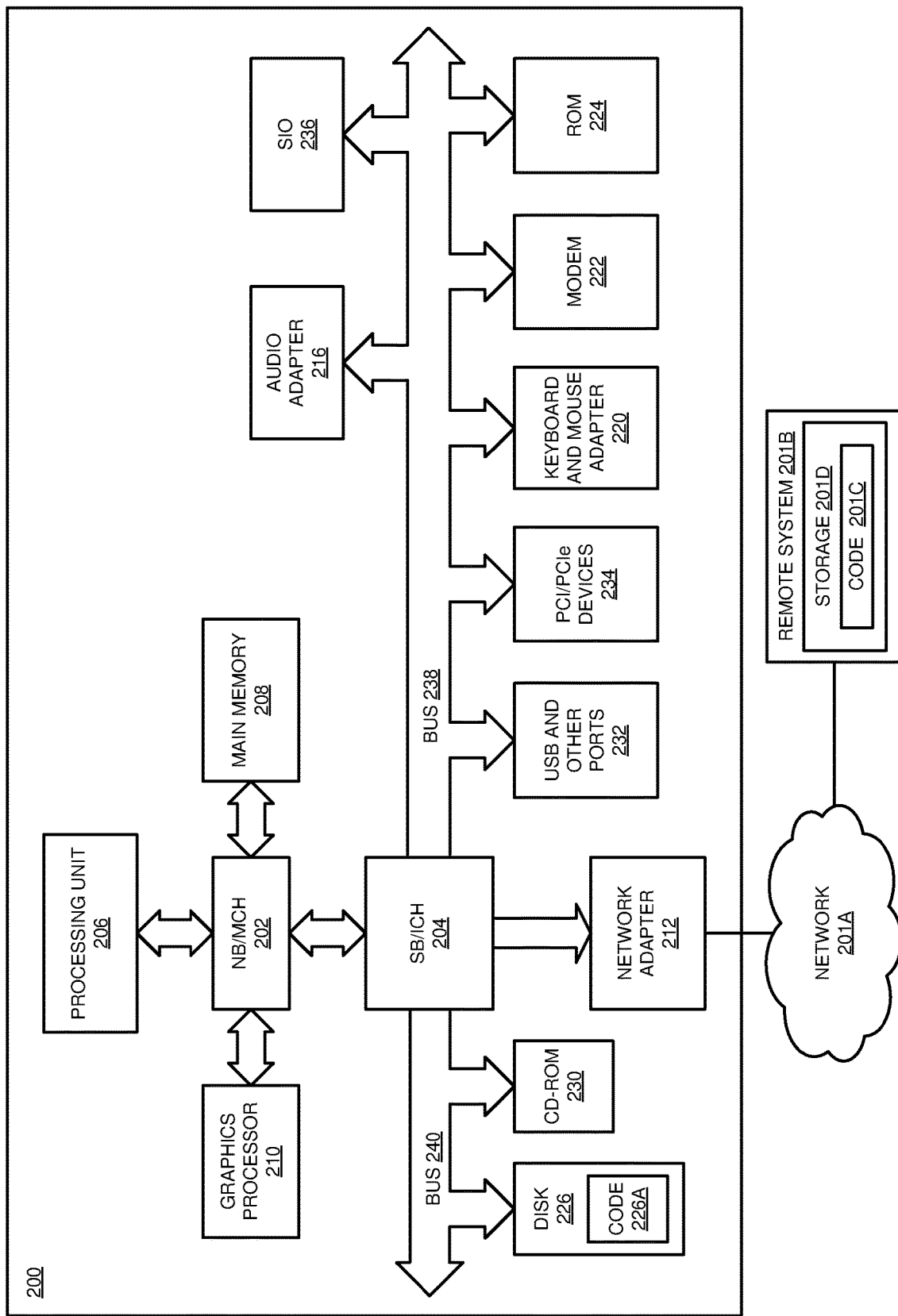
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

With reference to FIG. 3, this figure depicts a block diagram of an example messaging application summarization environment 300 in accordance with an illustrative embodiment. The example embodiment includes a summarization application 312 for summarizing conversations in a messaging application. In a particular embodiment, summarization application 312 are examples of applications 105A/105B of FIG. 1.

In some embodiments, a messaging application generates a first computer-generated user interface 302 that includes a navigation menu 306, a conversation list 308, and a conversation view 310. The example navigation elements in the navigation menu 306, listed conversations in the conversation list 308, and messages in the conversation view 310 are for purposes of illustration only and are not limiting of implementations of disclosed embodiments. For example, the messages in the conversation view 310 may be illustrative of a conversation thread comprised of various text messages displayed on a handheld computing device, the listed conversations in the conversation list 308 may be illustrative of a conversation based on groups of users, topics, or other criteria.

In some embodiments, a given user may receive tens or hundreds of electronic messages, text messages, discussion forum messages, and the like over any given period of time, and each of the received messages may relate to a variety of different issues or may be part-of a conversation involving a specific list of one or more other users. The messaging application organizes these messages into conversations in the conversation list 308. In some embodiments, the conversations are referred to by other names, such as channels, groups, or chat rooms.

In the illustrated embodiment, a summarization application 312 receives messages in the form of real-time or near real-time conversation data and responds with provides a headline banner and a summary from the conversation data. In some embodiments, the summarization application checks the summary for readability before sending it the messaging application, for example using one or both of expressions (1) and (2) below:

$$0.1579\left(\frac{\text{difficult words}}{\text{words}} \times 100\right) + 0.0496\left(\frac{\text{words}}{\text{sentences}}\right) \quad (1)$$

$$0.4 \times \left[\left(\frac{\text{total words}}{\text{total sentences}}\right) + 100\left(\frac{\text{complex words}}{\text{total words}}\right)\right] \quad (2)$$

In some such embodiments, the messaging application receives the headline banner and summary, and adjusts the user interface 302 by generating a user interface 304 that includes a summary panel 314 that displays the headline banner and summary. The example headline banner and summary shown in summary panel 314 are for purposes of illustration only and are not limiting of implementations of disclosed embodiments.

Figure 4A:
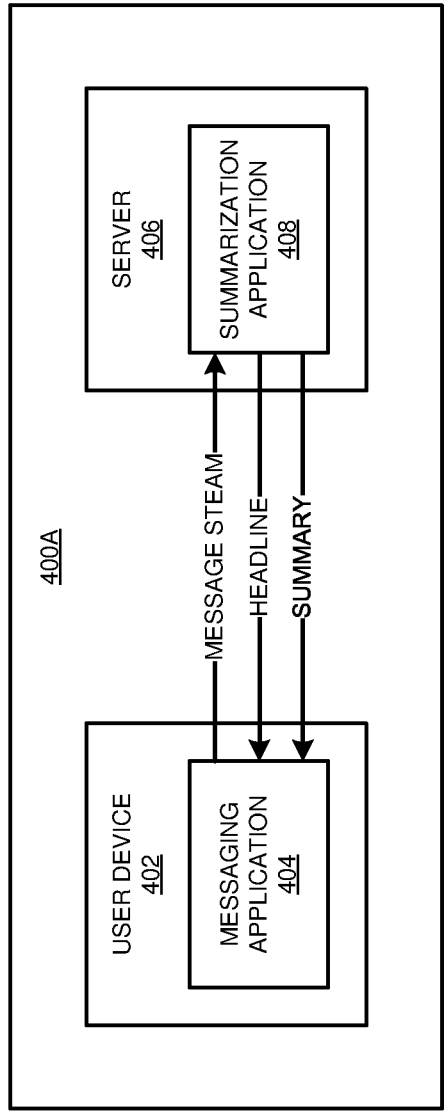
FIG. 4A depicts a block diagram of an example client/server arrangement that can be utilized with a summarization application in accordance with illustrative embodiments.
Figure 4B:
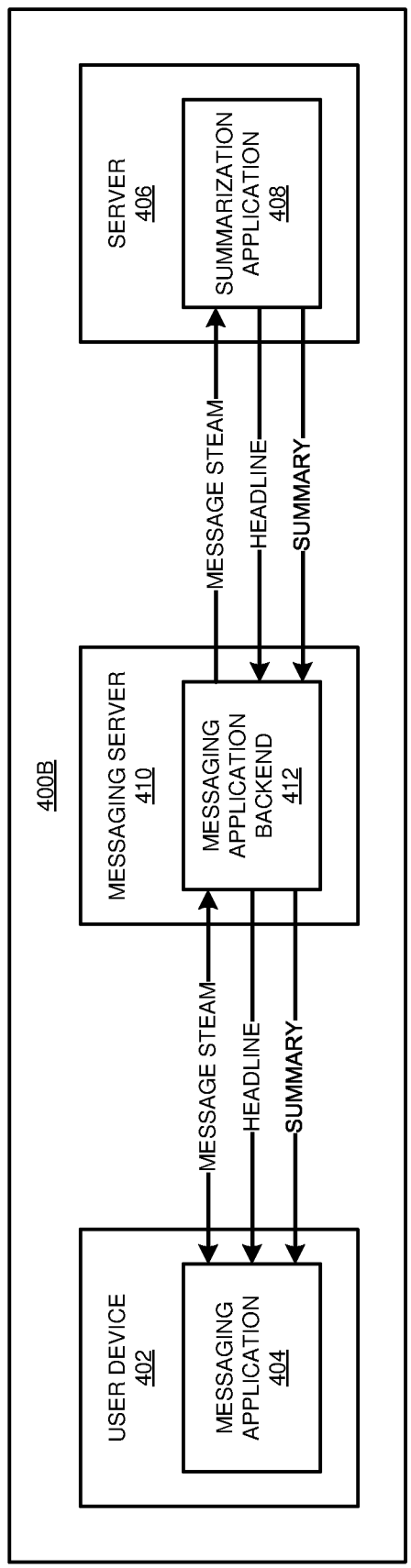
FIG. 4B depicts a block diagram of an example client/server arrangement that can be utilized with a summarization application in accordance with illustrative embodiments.

With reference to FIGS. 4A-4B, these figures depict block diagrams 400a, 400b of example client/server arrangements that can be utilized with a summarization application 408 in accordance with illustrative embodiments. In a particular embodiment, the user device 402 is an example of device 132 or clients 110, 112, and 114 of FIG. 1, and server 406 is an example of processing system 104 or server 106 of FIG. 1, where the summarization application 408 is an example of application 105A/105B of FIG. 1. The arrangements shown in FIGS. 4A-4B are shown as examples of numerous other architectures or arrangements that may be used in actual implementations.

In the illustrated embodiment shown in FIG. 4A, a user device 402 has a messaging application 404 installed that communicates over a network with a server 406 that hosts the summarization application 408. In some embodiments, the messaging application 404 generates a user interface as shown in FIG. 3 and allows a user to transmit and receive messages with other users communicating over a network. The messaging application transmits these messages to the summarization application 408. In some embodiments, the messaging application 404 relays the messages in real-time or near real-time to the summarization application 408 as they are received by the messaging application 404. In other embodiments, the messaging application 404 transmits messages in batches to the summarization application 408 automatically, for example according to a pre-established schedule or other criteria. In other embodiments, the messaging application 404 transmits messages in batches to the summarization application 408 in response to a command input from a user.

In the illustrated embodiment, the summarization application 408 receives messages from the messaging application 404 and processes the messages to generate a headline and a summary. The summarization application 408 then transmits the headline and summary back to the messaging application 404. In some embodiments, the summarization application 408 transmits the headline to the messaging application 404 while the summarization application 408 is still generating the summary. In other embodiments, the summarization application 408 delays transmitting the headline to the messaging application 404 until the summarization application 408 has completed generating the summary, at which point the summarization application 408 transmits the headline and summary together to the messaging application. In some embodiments, the process of receiving messages from the messaging application 404 and responding with transmissions of headlines/headline updates and summaries/summary updates is an ongoing process that results in numerous revisions and refinements to the headline and summary being provided to the messaging application 404.

In some embodiments, the server 406 also serves as a messaging server that hosts a server-side application for relaying messages to and from the messaging application 404 on the user device 402 that are directed to or received from other user devices. In other embodiments, the server-side application is hosted on a separate server while the server 406 hosts the summarization application 408.

The illustrated embodiment shown in FIG. 4B illustrates an example of an arrangement in which a separate messaging server 410 hosts a server-side messaging application 412 associated with the messaging application 404 on the user device 402. In the illustrated embodiment, the server-side messaging application 412 relays messages to and from the messaging application 404 on the user device 402 that are directed to or received from other user devices. In some such embodiments, the server-side messaging application 412 also transmits the messages to the summarization application 408 on server 406. In some such embodiments, the server-side messaging application 412 relays the messages in real-time or near real-time to the summarization application 408 as they are received for transmission to and from the messaging application 404. In other embodiments, the server-side messaging application 412 transmits messages in batches to the summarization application 408 automatically, for example according to a pre-established schedule or other criteria. In other embodiments, the server-side messaging application 412 transmits messages in batches to the summarization application 408 in response to a command input from the user via the messaging application 404 that causes the user device 402 to transmit the command to the server-side messaging application 412.

In the illustrated embodiment, the summarization application 408 receives messages from the server-side messaging application 412 and processes the messages to generate a headline and a summary. The summarization application 408 then transmits the headline and summary back to the server-side messaging application 412, which in turn transmits the headline and summary to the messaging application 404. In some embodiments, the summarization application 408 transmits the headline to the server-side messaging application 412 while the summarization application 408 is still generating the summary. In other embodiments, the summarization application 408 delays transmitting the headline to the server-side messaging application 412 until the summarization application 408 has completed generating the summary, at which point the summarization application 408 transmits the headline and summary together to the server-side messaging application 412. In some embodiments, the process of receiving messages from the server-side messaging application 412 and responding with transmissions of headlines/headline updates and summaries/summary updates is an ongoing process that results in numerous revisions and refinements to the headline and summary being provided to the messaging application 404 via the server-side messaging application 412 from the summarization application 408.

Figure 5A:
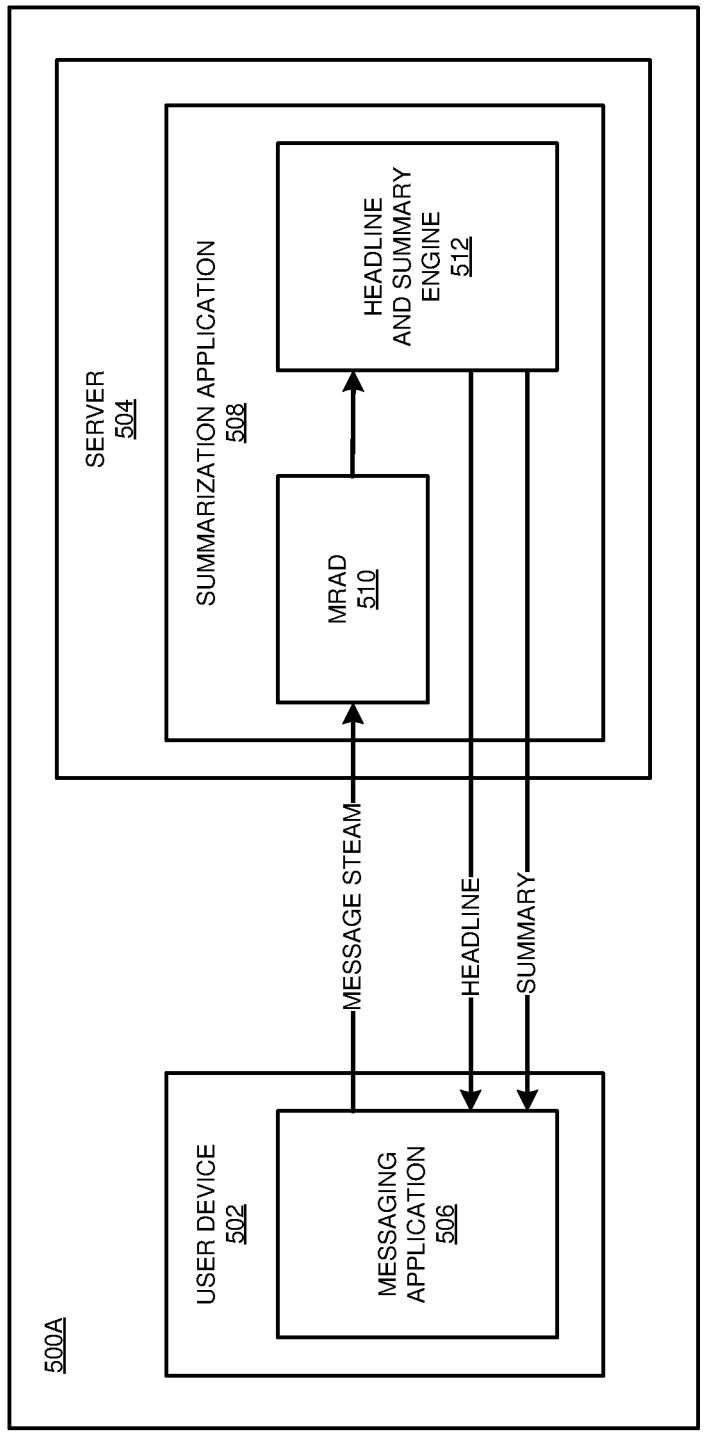
FIG. 5A depicts a block diagram of an example arrangement for providing functionality described herein that can be utilized with a summarization application in accordance with illustrative embodiments.
Figure 5B:
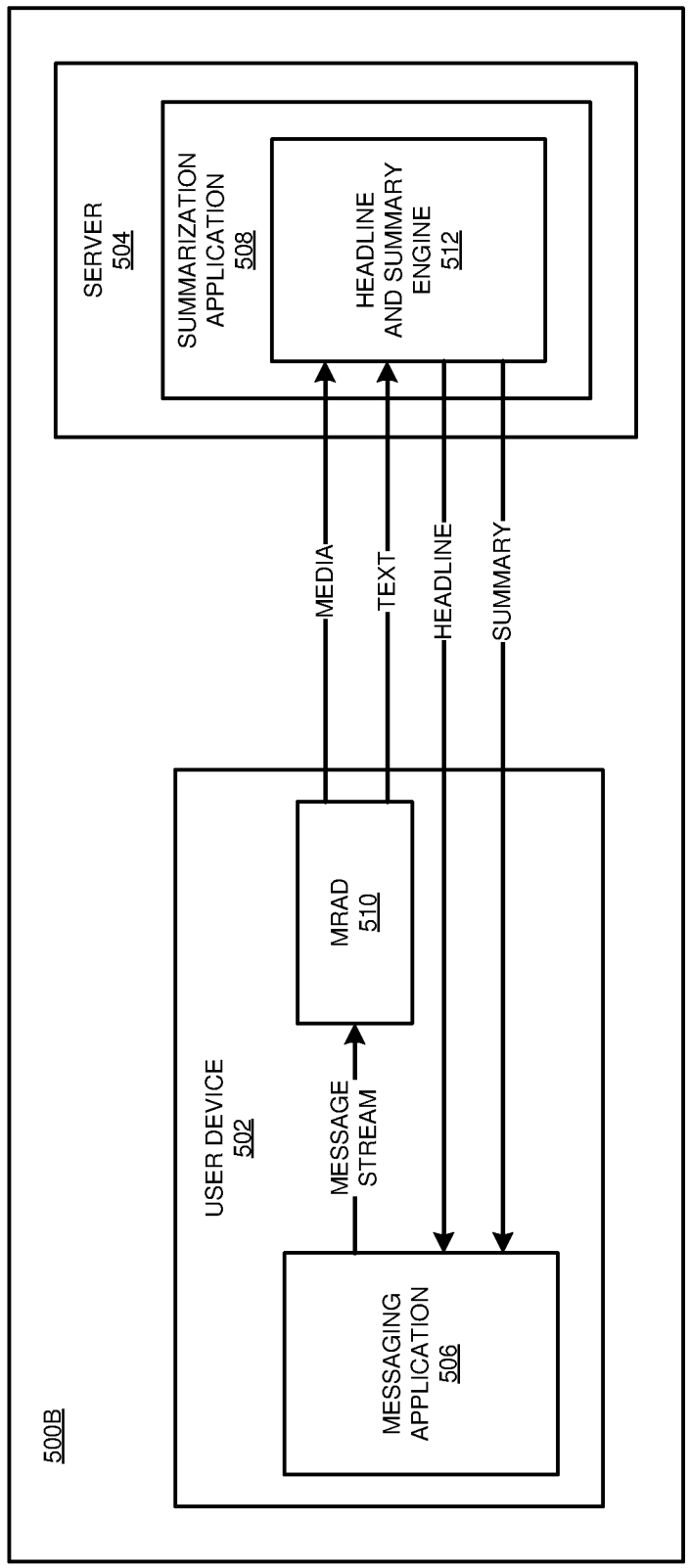
FIG. 5B depicts a block diagram of an example arrangement for providing functionality described herein that can be utilized with a summarization application in accordance with illustrative embodiments.

With reference to FIGS. 5A-5C, these figures depict block diagrams 500a-500c of example arrangements for providing functionality described herein that can be utilized with a summarization application 508 in accordance with illustrative embodiments. In a particular embodiment, the user device 502 is an example of device 402 of FIGS. 4A-4B, and server 504 is an example of server 406 of FIGS. 4A-4B, where the messaging application 506 is an example of messaging application 404 of FIGS. 4A-4B and summarization application 508 is an example of summarization application 408 of FIGS. 4A-4B. The arrangements shown in FIGS. 5A-5C are shown as examples of numerous other architectures or arrangements that may be used in actual implementations.

In the illustrated embodiment shown in FIG. 5A, a user device 502 has a messaging application 506 installed that communicates over a network with a server 504 that hosts the summarization application 508. In some embodiments, the messaging application 506 generates a user interface as shown in FIG. 3 and allows a user to transmit and receive messages with other users communicating over a network, where the messages may include two or more modalities, for example a text component and a media component, where the media component may include various types of multimedia, such as images, audio, and video. The messaging application transmits the multi-modal messages to the summarization application 508. In the illustrated embodiment, the summarization application 508 comprises a modality recognition and division (MRAD) module 510 for dividing the input message stream into two modalities, referred to hereafter as a text component and a media component. In some embodiments, the MRAD module 510 comprises modules for identifying and distinguishing the textual portions of the message stream from the media components. For example, in some embodiments, the MRAD module 510 comprises a story segment identifier (SSI) module for recognizing and outputting video elements, an audio identifier (AI) module for identifying and outputting audio elements, and a text identifier (TI) module for identifying and outputting the text components.

In some embodiments, the summarization application 508 comprises a headline and summary engine 512 that receives the separate text and media components of the messages from the messaging application 506 and processes text and media components of the messages to generate a headline and a summary. The headline and summary engine 512 then transmits the headline and summary back to the messaging application 506. In some embodiments, the headline and summary engine 512 transmits the headline to the messaging application 506 while the headline and summary engine 512 is still generating the summary. In other embodiments, the headline and summary engine 512 delays transmitting the headline to the messaging application 506 until the headline and summary engine 512 has completed generating the summary, at which point the headline and summary engine 512 transmits the headline and summary together to the messaging application. In some embodiments, the process of receiving messages from the messaging application 506 and responding with transmissions of headlines/headline updates and summaries/summary updates is an ongoing process that results in numerous revisions and refinements to the headline and summary being provided to the messaging application 506.

In the illustrated embodiment shown in FIG. 5B, the MRAD 510 is installed on the user device 502 rather than on the server 504. Thus, in the embodiment shown in FIG. 5B, the summarization application 508 includes a client-side application that includes the MRAD 510. In some such embodiments, the messaging application 506 generates a user interface as shown in FIG. 3 and allows a user to transmit and receive messages with other users communicating over a network, where the messages may include two or more modalities, for example a text component and a media component, where the media component may include various types of multimedia, such as images, audio, and video. In some such embodiments, the messaging application 506 transmits the multi-modal messages to the client-side MRAD 510. In alternative embodiments, the client-side MRAD 510 receives at least some of the multi-modal messages directly from a server-side component of the messaging application, such as the messaging application back-end 412 of FIG. 4B.

In the illustrated embodiment, the user device 502 comprises the MRAD module 510 for dividing the input message stream into at least two modalities, referred to hereafter as a text component and a media component. In some embodiments, the MRAD module 510 comprises modules for identifying and distinguishing the textual portions of the message stream from the media components. For example, in some embodiments, the MRAD module 510 comprises a story segment identifier (SSI) module for recognizing and outputting video elements, an audio identifier (AI) module for identifying and outputting audio elements, and a text identifier (TI) module for identifying and outputting the text components.

In some embodiments, the summarization application 508 comprises a headline and summary engine 512 that receives the separate text and media components of the messages from the MRAD 510 on the user device 502 and processes the text and media components of the messages to generate a headline and a summary. The headline and summary engine 512 then transmits the headline and summary back to the messaging application 506. In some embodiments, the headline and summary engine 512 transmits the headline to the messaging application 506 while the headline and summary engine 512 is still generating the summary. In other embodiments, the headline and summary engine 512 delays transmitting the headline to the messaging application 506 until the headline and summary engine 512 has completed generating the summary, at which point the headline and summary engine 512 transmits the headline and summary together to the messaging application. In some embodiments, the process of receiving messages from the messaging application 506 and responding with transmissions of headlines/headline updates and summaries/summary updates is an ongoing process that results in numerous revisions and refinements to the headline and summary being provided to the messaging application 506.

In the illustrated embodiment shown in FIG. 5C, the MRAD 510 is a module of the messaging application 506 installed on the user device 502 rather as a stand-alone client-side application or installed on the server 504. Thus, in the embodiment shown in FIG. 5C, the messaging application 506 includes an MRAD 510. In some such embodiments, the messaging application 506 generates a user interface as shown in FIG. 3 and allows a user to transmit and receive messages with other users communicating over a network, where the messages may include two or more modalities, for example a text component and a media component, where the media component may include various types of multimedia, such as images, audio, and video. In some such embodiments, the messaging application 506 uses the MRAD 510 to process the multi-modal messages into separate text and media components prior to transmitting them to the server 504. In some embodiments, the MRAD module 510 comprises modules for—identifying and distinguishing the textual portions of the message stream from the media components. For example, in some embodiments, the MRAD module 510 comprises a story segment identifier (SSI) module for recognizing and outputting video elements, an audio identifier (AI) module for identifying and outputting audio elements, and a text identifier (TI) module for identifying and outputting the text components.

In some embodiments, the summarization application 508 comprises a headline and summary engine 512 that receives the separate text and media components of the messages from the MRAD 510 on the user device 502 and processes the text and media components of the messages to generate a headline and a summary. The headline and summary engine 512 then transmits the headline and summary back to the messaging application 506. In some embodiments, the headline and summary engine 512 transmits the headline to the messaging application 506 while the headline and summary engine 512 is still generating the summary. In other embodiments, the headline and summary engine 512 delays transmitting the headline to the messaging application 506 until the headline and summary engine 512 has completed generating the summary, at which point the headline and summary engine 512 transmits the headline and summary together to the messaging application. In some embodiments, the process of receiving messages from the messaging application 506 and responding with transmissions of headlines/headline updates and summaries/summary updates is an ongoing process that results in numerous revisions and refinements to the headline and summary being provided to the messaging application 506.

Figure 6:
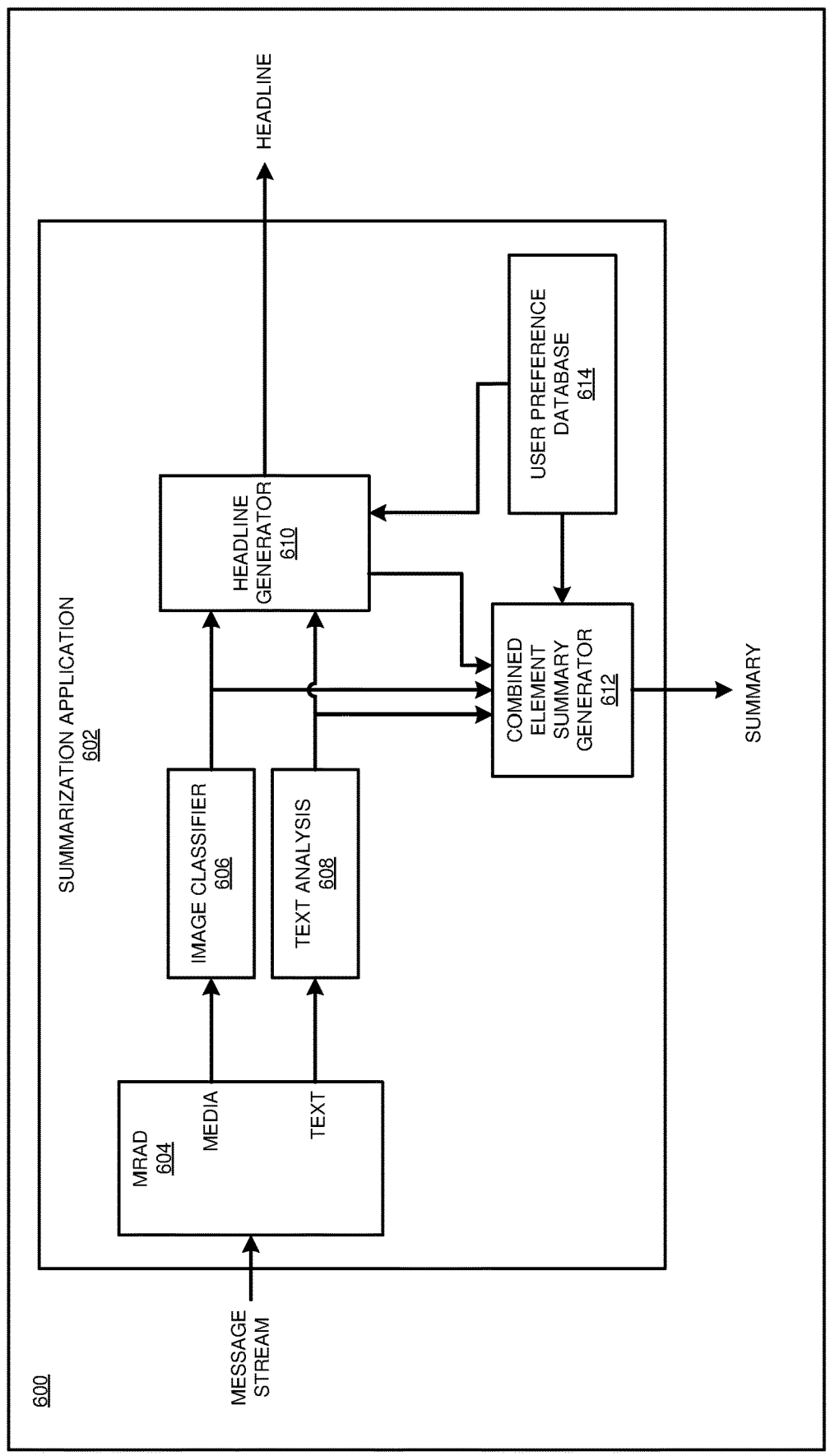
FIG. 6 depicts a more detailed block diagram of an example summarization application in accordance with an illustrative embodiment.

With reference to FIG. 6, this figure depicts a more detailed block diagram 600 of an example summarization application 602 in accordance with an illustrative embodiment. In a particular embodiment, the example summarization application 602 is an example of summarization application 508 of FIG. 5A that comprises an MRAD 604, which is an example of the MRAD of FIG. 5A. Alternative embodiments of the summarization application 602 do not include the MRAD 604, corresponding with the summarization application 508 of FIGS. 5B and 5C that do not include an MRAD.

In the illustrated embodiment, the summarization application 602 also comprises an image classifier module 606, a text analysis module 608, a headline generator 610, and a combined element summary generator 612. The media component and text component are output from the MRAD module 604 to the image classifier module 606 and the text analysis module 608, respectively. The image classifier module 606 and the text analysis module 608 comprise respective machine-learning models for identifying key elements from the message stream received from a messaging application, such as the messaging application 506 in FIGS. 5A-5C. The key elements are output to the headline generator 610 and the summary generator 612, where they are used to generate a headline and summary associated with one or more topics of the message stream. In some embodiments, one or both of the headline generator 610 and summary generator 612 consider user preferences when generating the headline/summary. In some such embodiments, the summarization application 602 further comprises a user preference database 614 that stores one or more user preferences for one or more users. In some such embodiments, one or both of the headline generator 610 and summary generator 612 has access to the stored user preference(s) for use in generating and headline and/or summary.

In alternative embodiments, the summarization application 602 can include some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications. For example, in alternative embodiments, the user preference database 614 is located on a user device, such as user device 502 of FIG. 5A, rather than as part of the summarization application 602.

In some embodiments, the text analysis module 608 collects some amount of conversation data from the message stream and implements a machine-learning mechanism to enhance a topic modeling operation for text analysis of the text component of collected real-time conversation data to identify key words associated with the conversation data. In some embodiments, the image classifier 606 collects some amount of conversation data from the message stream and implements a machine-learning mechanism to enhance a topic modeling operation for image classification of the media component of collected real-time conversation data to identify key terms associated with the conversation data. In some embodiments, the outputs from the image classifier module 606 and text analysis module 608 are input to the headline generator 610 and the summary generator 612.

In some embodiments, the headline generator 610 combines the key words from the text analysis module 608 and the key terms from the image classifier module 606 into a first group of key elements. In some such embodiments, the headline generator 610 generates a headline banner from the first group of key elements. In some such embodiments, the headline banner includes key elements selected from the first group of key elements based on an analysis involving predetermined criteria.

In some embodiments, the summary generator 612 combines key words from the text analysis module 608 and the key terms from the image classifier module 606 into a second group of key elements. In some such embodiments, the summary generator 612 generates a summary from the second group of key elements. In some such embodiments, the summary includes key elements selected from the second group of key elements based on an analysis involving predetermined criteria. In some embodiments, the summary generator 612 uses additional key words and key terms that are associated with conversation data from the message stream generated over some pre-established amount of time or some amount of time selected based on some criteria. For example, in some embodiments, the summary generator 612 receives the headline generated by the headline generator and calculates a coherence score using known methods. For example, in some such embodiments, the coherence score is a measure of a degree of semantic similarity between the headline and high scoring (highly relevant) words in the summary.

In some embodiments, the headline generator 610 and/or the summary generator 612 considers user preferences while generating a headline/summary. For example, in some embodiments, the headline generator 610 and/or the summary generator 612 accumulates and stores a number of key elements based at least in part on a user preference or setting that allows a user to impose some control over the size of the corpus and the severity of the data sparsity of the corpus, which can influence the accuracy of the headline and summary. In some embodiments, the headline generator 610 and/or the summary generator 612 accumulates and stores a number of key elements based at least in part on a complexity score calculated according to known methods, for example based on the linguistic difficulty of the topic, where a summary or headline becomes more accurate as the size of the corpus increases particularly due to the difficult nature of the topic of discussion.

Figure 7:
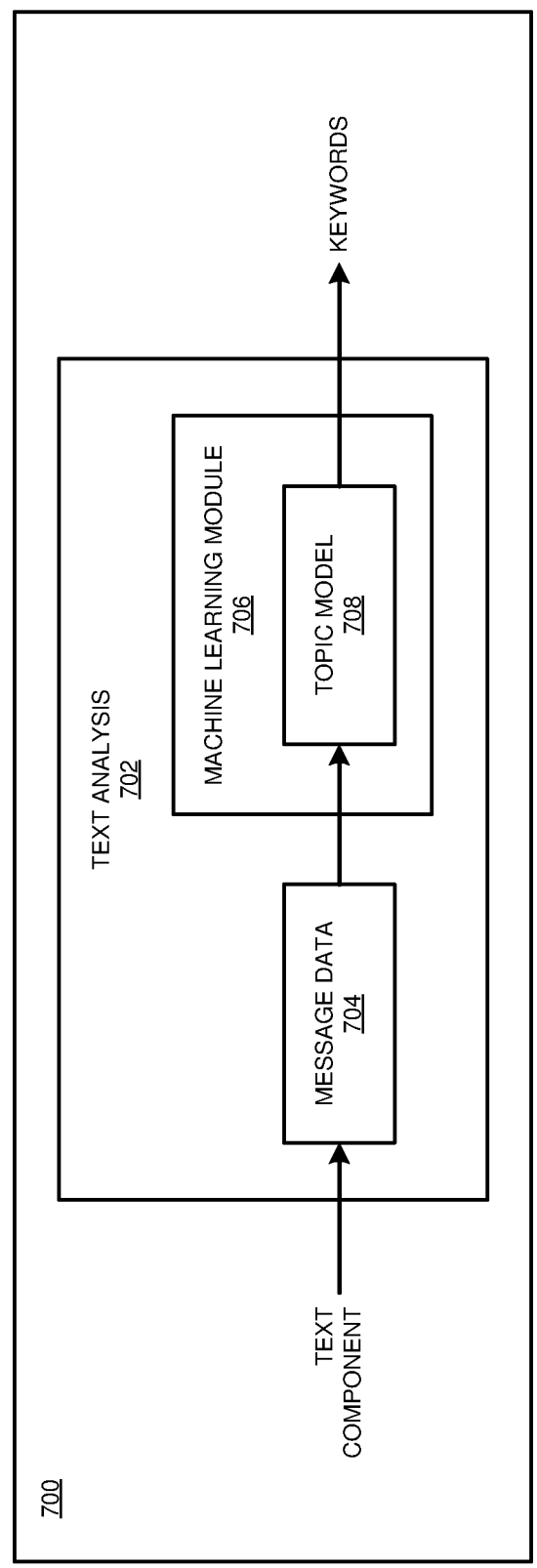
FIG. 7 depicts a more detailed block diagram of an example text analysis module in accordance with an illustrative embodiment.

With reference to FIG. 7, this figure depicts a more detailed block diagram 700 of an example text analysis module 702 in accordance with an illustrative embodiment. In a particular embodiment, the example text analysis module 702 is an example of text analysis module 608 of FIG. 6.

In some embodiments, the text analysis module 702 includes message data memory 704 and a machine learning module 706 that includes a topic model 708. In some such embodiments, the message data memory 704 receives the text component of message data and accumulates message data. In some embodiments, the machine learning module 706 receives message data from the message data memory 704 and uses a topic model 708 to detect a topic and key terms from the words in the message data. For example, in some embodiments, the topic model 708 is a Biterm Topic Model or a Latent Dirichlet Allocation (LDA) model, although the Biterm topic model is preferred for a smaller corpus. In some embodiments, the text analysis module 702 uses a set of features and machine learning techniques to generate a model 708. In some such embodiments, the model may be built once and can be used to identify acronyms and abbreviations in any body of text. Text can be a natural language question or passage, of any text in a document.

Figure 8:
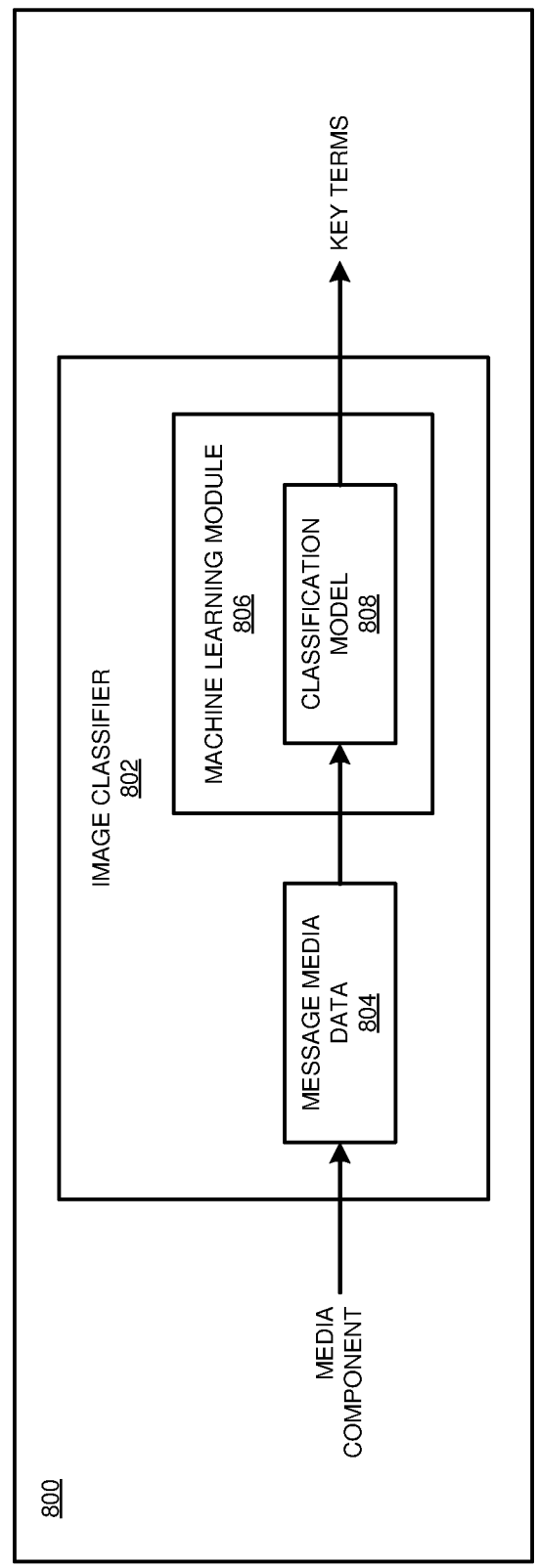
FIG. 8 depicts a more detailed block diagram of an example image classifier module 802 in accordance with an illustrative embodiment.

With reference to FIG. 8, this figure depicts a more detailed block diagram 800 of an example image classifier module 802 in accordance with an illustrative embodiment. In a particular embodiment, the example image classifier module 802 is an example of image classifier module 606 of FIG. 6.

In some embodiments, the image classifier module 802 includes message data memory 804 and a machine learning module 806 that includes a classification model 808. In some such embodiments, the message data memory 804 receives the media component of message data and accumulates message data. In some embodiments, the machine learning module 806 receives message data from the message data memory 804 and uses a classification model 808 to detect a topic and key terms from the media elements in the message data. For example, in some embodiments, the classification model 808 is a known regression filter or a supervised or unsupervised classifier. In some such embodiments, the model may be built once and can be used to classify images and other media elements.

Figure 9:
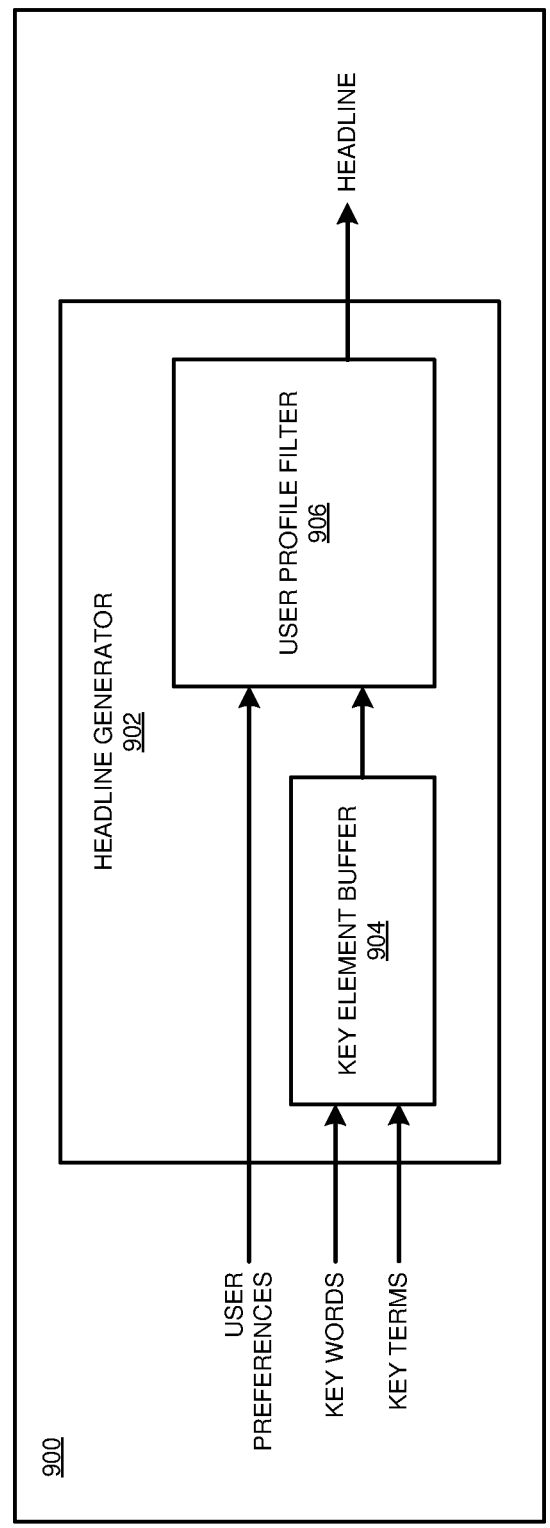
FIG. 9 depicts a more detailed block diagram of an example headline generator 902 in accordance with an illustrative embodiment.

With reference to FIG. 9, this figure depicts a more detailed block diagram 900 of an example headline generator 902 in accordance with an illustrative embodiment. In a particular embodiment, the example headline generator 902 is an example of headline generator 610 of FIG. 6.

In some embodiments, the headline generator 902 includes a key element buffer 904 and a user profile filter 906. In some such embodiments, the key element buffer 904 receives the key words and key terms from a text analysis module and image classifier module, respectively, for example the text analysis module 608 and image classifier module 606 of FIG. 6. In some embodiments, the headline generator 902 includes one or more filters, constraints, and/or ranking modules to derive a headline from the key elements that are made up of the key words and key terms. In the illustrated embodiment, the headline generator 902 includes a user profile filter 906 that has access to user preferences and uses one or more user preferences to filter key elements so as to derive a headline.

Figure 10:
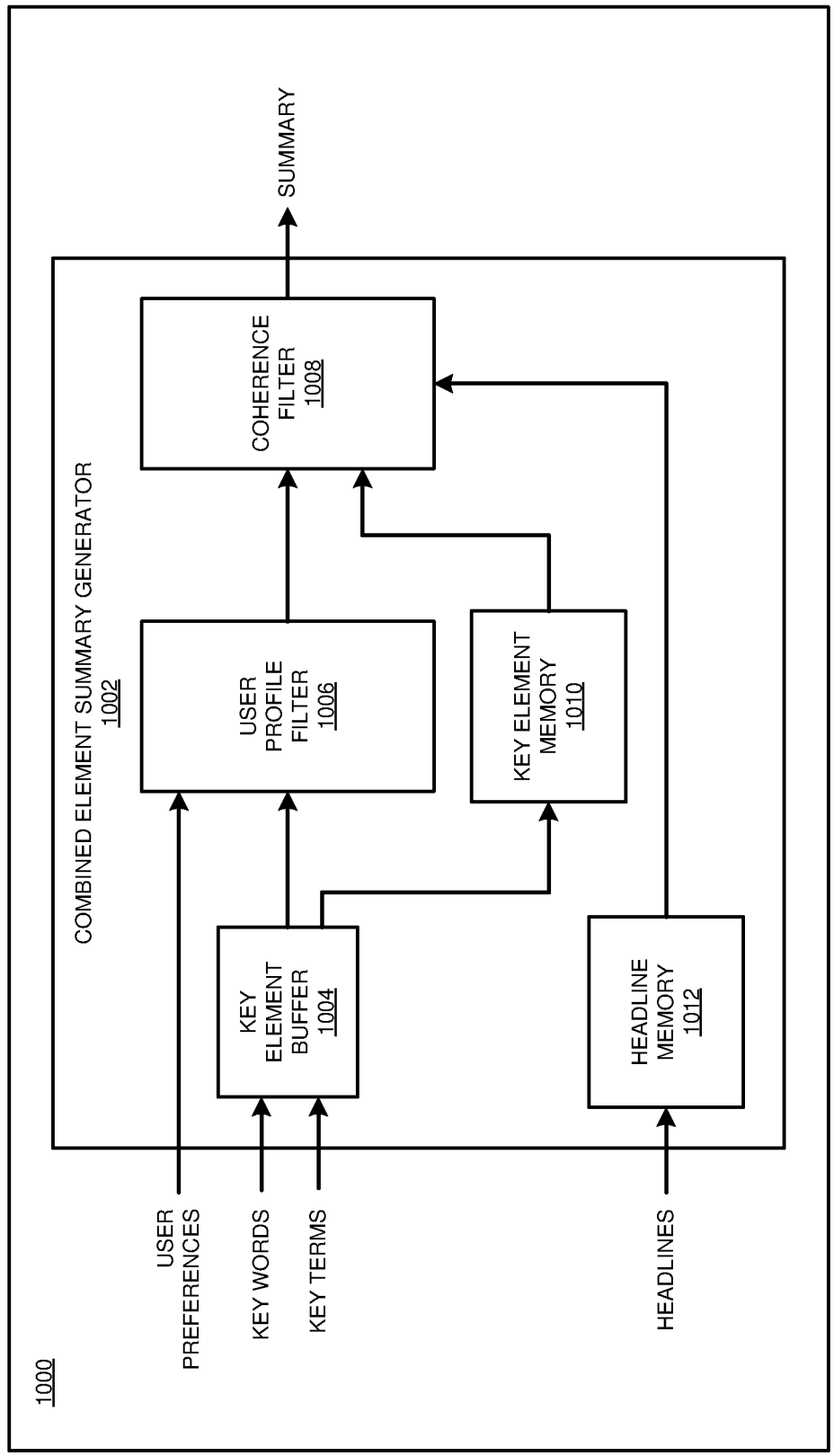
FIG. 10 depicts a more detailed block diagram of an example combined element summary generator in accordance with an illustrative embodiment.

With reference to FIG. 10, this figure depicts a more detailed block diagram 1000 of an example combined element summary generator 1002 in accordance with an illustrative embodiment. In a particular embodiment, the example summary generator 1002 is an example of summary generator 612 of FIG. 6.

In some embodiments, the summary generator 1002 includes a key element buffer 1004 and a user profile filter 1006. In some such embodiments, the key element buffer 1004 receives the key words and key terms from a text analysis module and image classifier module, respectively, for example the text analysis module 608 and image classifier module 606 of FIG. 6. In some embodiments, the summary generator 1002 includes one or more filters, constraints, and/or ranking modules to derive a summary from the key elements that are made up of the key words and key terms. In the illustrated embodiment, the summary generator 1002 includes a user profile filter 1006 that has access to user preferences and uses one or more user preferences to filter key elements so as to derive a summary.

In some embodiments, the summary generator 1002 includes a coherence filter 1008 that receives the output from the user profile filter 1006, accumulated key elements in a key element memory 1010, and receives a headline from a headline memory 1012. In some embodiments, the coherence filter 1008 receives the headline generated by the headline generator and calculates a coherence score using known methods. For example, in some such embodiments, the coherence score is a measure of a degree of semantic similarity between the headline and high scoring (highly relevant) words in the summary. In some embodiments, the summary generator 1002 uses the coherency score to determine whether the summary is complete, or if a larger corpus is needed from the key element memory 1010 to generate an accurate summary.

Figure 11:
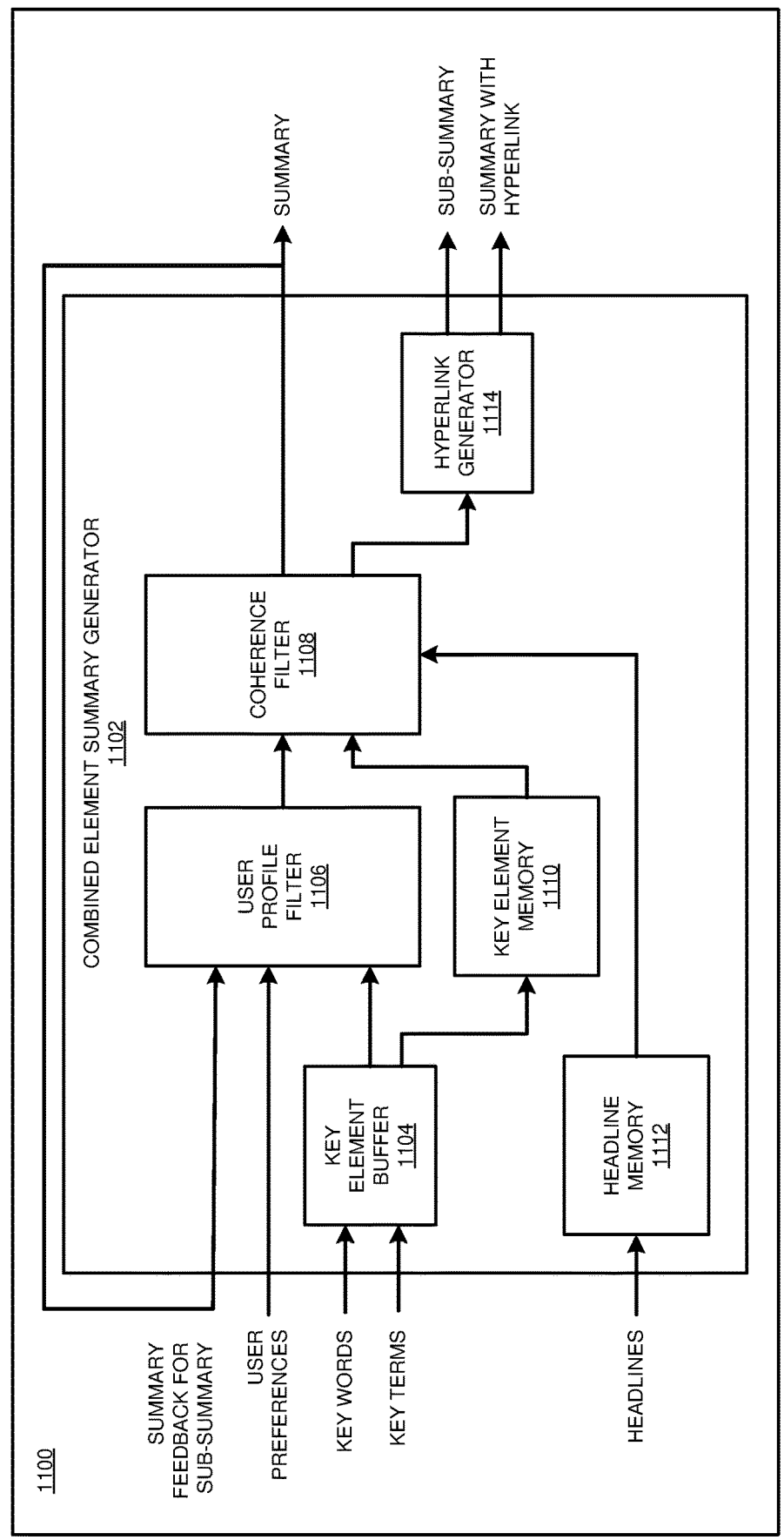
FIG. 11 depicts a more detailed block diagram of an example combined element summary generator in accordance with an illustrative embodiment.

With reference to FIG. 11, this figure depicts a more detailed block diagram 1100 of an example combined element summary generator 1102 in accordance with an illustrative embodiment. In a particular embodiment, the example summary generator 1102 is an example of summary generator 612 of FIG. 6 that is further capable of creating sub-summaries that have the potential to be added to the main summary.

In some embodiments, the summary generator 1102 is similar to the summary generator 1002 in that it includes a key element buffer 1104 and a user profile filter 1106 where the key element buffer 1104 receives and buffers key words and key terms, and the user profile filter 1106 that receives the buffered key words and terms and filters them based on user preferences to derive a summary. The summary generator 1102 also includes a coherence filter 1108 that receives the output from the user profile filter 1106, accumulated key elements in a key element memory 1110, and a headline from a headline memory 1112, and calculates a coherence score as a measure of a degree of semantic similarity between the headline and high scoring (highly relevant) words in the summary. In some embodiments, the summary generator 1102 uses the coherency score to determine whether the summary is complete, or if a larger corpus is needed from the key element memory 1110 to generate an accurate summary.

The illustrated embodiment of the summary generator 1102 further comprises a hyperlink generator 1114 that receives a summary output from the coherence filter 1108. In some embodiments, the summary generator 1102 provides summarization sub-levels where a summary can include sub-summaries where more in-depth summaries are hyperlinked and available via the user interface, so that a user has the ability to expand or collapse sections or topics that may be of relevance. In some such embodiments, a learning corpus is leveraged to identify frequency of when the sub-content is viewed and determine if the main summary should be expanded to include the sub-content for future viewing. Thus, in some embodiments, the summary generator can also receive data representative of statistics indicating number and/or frequency of views and use that data to determine if a sub-summary should be merged with a main summary.

In some embodiments, the summary generator 1102 uses the summary combined with additional incoming conversation data to update the summary and/or add a sub-summary. In some embodiments, the summary data is output to the user for display, and it is also fed back as an input to the user profile filter 1106. Alternatively, the summary generator 1102 can store the summary in memory and the user profile filter 1106 accesses the summary from memory for generating an updated summary or sub-summary. In some embodiments, the sub-summary is output through the hyperlink generator 1114, which is displayed with the summary, for example on panel 314 in FIG. 3. The hyperlink, if activated by a user, causes the panel 314 to display the sub-summary.

In some embodiments, the hyperlink provides statistics to the summary generator 1102 indicating view statistics for corresponding sub-summaries. In some embodiments, if the sub-summary views reach a predetermined threshold, the summary generator 1102 generates a new summary to replace the summary at the user's device that includes the content of the sub-summary. Alternatively, the user's device or messaging application handles the merging of a sub-summary with a summary if the threshold number of views is reached. In some embodiments, the summary generator 1102 generates further sub-summaries and/or summaries that continue down deeper layers, i.e., sub-sub-summaries, sub-sub-sub-summaries, etc. In some such embodiments, the summary generator 1102 uses summary content from existing summaries and conversation data that has been generated since those summaries were generated to generate updated summaries or sub-summaries.

Figure 12:
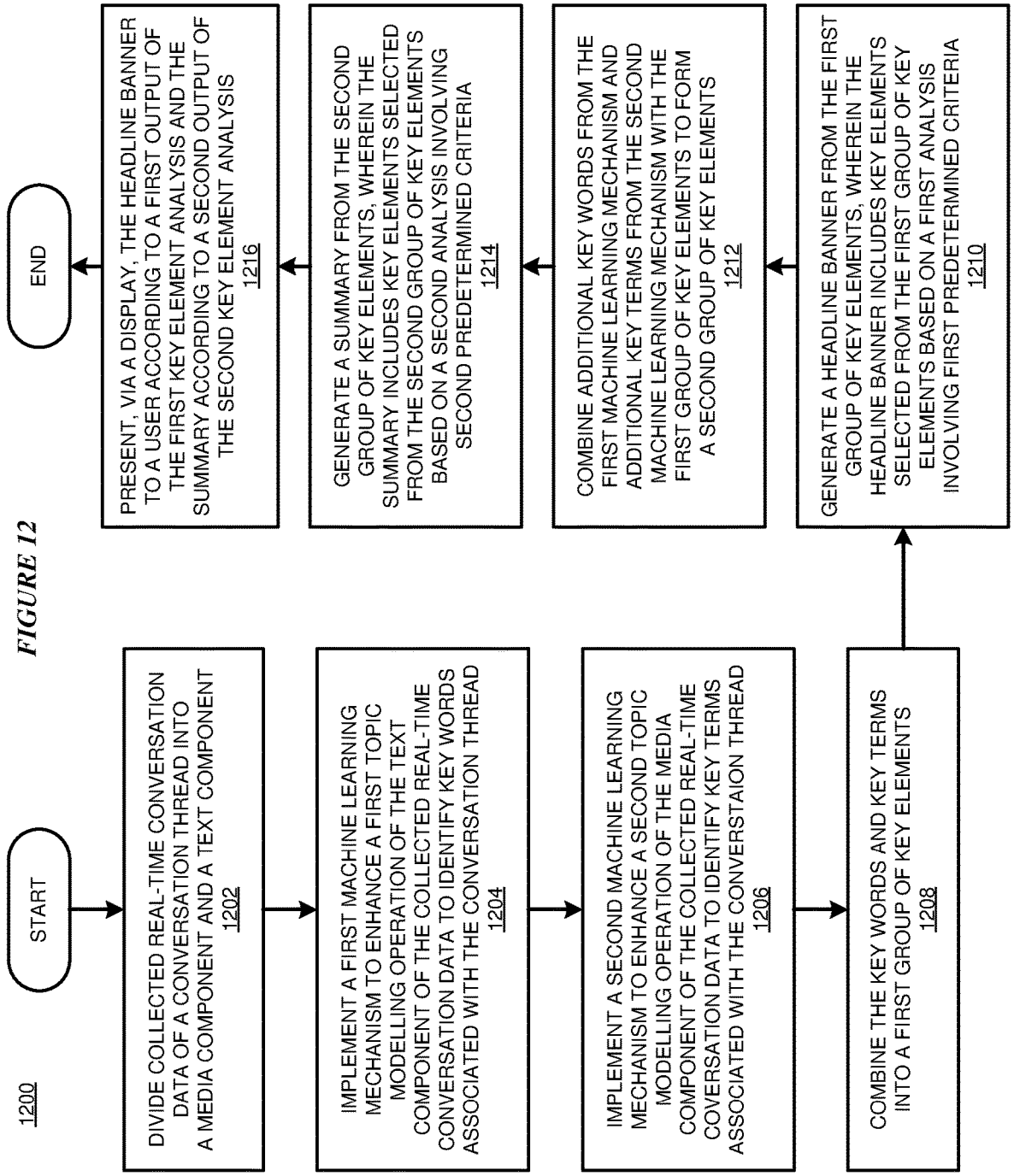
FIG. 12 depicts a flowchart of an example summarization process in accordance with an illustrative embodiment.

With reference to FIG. 12, this figure depicts a flowchart of an example summarization process 1200 in accordance with an illustrative embodiment. In a particular embodiment, the summarization application disclosed herein carries out the process shown in FIG. 12.

In an embodiment, at block 1202, the application divides collected real-time conversation data of a conversation thread into a media component and a text component. In an embodiment, at block 1204, the application implements a first machine learning mechanism to enhance a first topic modeling operation of the text component of the collected real-time conversation data to identify key words associated with the conversation thread. In an embodiment, at block 1206, the application implements a second machine learning mechanism to enhance a second topic modeling operation of the media component of the collected real-time conversation data to identify key terms associated with the conversation thread. In an embodiment, at block 1208, the application combines the key words and key terms into a first group of key elements. In an embodiment, at block 1210, the application generates a headline banner from the first group of key elements, wherein the headline banner includes key elements selected from the first group of key elements based on a first analysis involving first predetermined criteria. In an embodiment, at block 1212, the application combines additional key words from the first machine learning mechanism and additional key terms from the second machine learning mechanism with the first group of key elements to form a second group of key elements. In an embodiment, at block 1214, the application generates a summary from the second group of key elements, wherein the summary includes key elements selected from the second group of key elements based on a second analysis involving second predetermined criteria. In an embodiment, at block 1216, the application presents, via a display, the headline banner according to a first output of the first key element analysis and the summary according to a second output of the second key element analysis.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   dividing collected real-time conversation data of a conversation thread into a media component and a text component;
   implementing a first machine learning mechanism to enhance a first topic modeling operation of the text component of the collected real-time conversation data to identify key words associated with the conversation thread;
   implementing a second machine learning mechanism to enhance a second topic modeling operation of the media component of the collected real-time conversation data to identify key terms associated with the conversation thread;
   combining the key words and key terms into a first group of key elements;
   generating a headline banner from the first group of key elements, wherein the headline banner includes key elements selected from the first group of key elements based on a first analysis involving first predetermined criteria;
   combining additional key words from the first machine learning mechanism and additional key terms from the second machine learning mechanism with the first group of key elements to form a second group of key elements;
   generating a summary from the second group of key elements, wherein the summary includes key elements selected from the second group of key elements based on a second analysis involving second predetermined criteria; and
   presenting, via a display, the headline banner according to a first output of the first key element analysis and the summary according to a second output of the second key element analysis.

2. The computer implemented method of claim 1, wherein the additional key words and key terms are associated with conversation data of the conversation thread generated over an amount of time selected based on a coherence score of the headline banner.

3. The computer implemented method of claim 1, wherein the summary includes a number of key elements determined based at least in part on a user preference.

4. The computer implemented method of claim 1, wherein the summary includes a number of key elements determined based at least in part on a complexity score of the second group of key elements.

5. The computer implemented method of claim 1, further comprising:
   updating, responsive to identifying that the summary meets predetermined updating criteria, the summary from a third group of key elements,
   wherein the third group of key elements is formed by combining additional key words from the first machine learning mechanism and additional key terms from the second machine learning mechanism with the second group of key elements.

6. The computer implemented method of claim 5, wherein the updating criteria includes a predefined subject matter.

7. The computer implemented method of claim 1, further comprising ranking the second group of key elements based on ranking criteria including relevance to the headline banner.

8. The computer implemented method of claim 1, further comprising:
   generating a sub-summary from the second group of key elements, wherein the sub-summary includes key elements selected from the second group of key elements based on a third analysis involving third predetermined criteria,
   wherein the third analysis results in the sub-summary being more extensive than the summary.

9. The computer implemented method of claim 8, further comprising presenting, via the display, a hyperlink to the sub-summary.

10. The computer implemented method of claim 8, further comprising combining, responsive to identifying a frequency of viewing of the sub-summary reaching a predetermined threshold, the sub-summary with the summary.

11. The computer implemented method of claim 1, wherein the summary further includes a media element from the media component of the conversation data.

12. The computer implemented method of claim 1, further comprising:
   determining, using similarity criteria applied to the summary and a second summary of a second conversation thread, whether the summary and the second summary refer to similar concepts; and
   highlighting, responsive to determining that the summary and the second summary refer to similar concepts, key elements of the summary that are different from the second summary.

13. A computer usable program product for summarizing mixed media conversations in a messaging application, the computer program product comprising one or more computer readable storage media, and program instructions collectively stored on the one or more computer readable storage media, the program instructions executable by a processor to cause the processor to perform operations comprising:
   dividing collected real-time conversation data of a conversation thread into a media component and a text component;
   implementing a first machine learning mechanism to enhance a first topic modeling operation of the text component of the collected real-time conversation data to identify key words associated with the conversation thread;
   implementing a second machine learning mechanism to enhance a second topic modeling operation of the media component of the collected real-time conversation data to identify key terms associated with the conversation thread;

combining the key words and key terms into a first group of key elements;

generating a headline banner from the first group of key elements, wherein the headline banner includes key elements selected from the first group of key elements based on a first analysis involving first predetermined criteria;

combining additional key words from the first machine learning mechanism and additional key terms from the second machine learning mechanism with the first group of key elements to form a second group of key elements;

generating a summary from the second group of key elements, wherein the summary includes key elements selected from the second group of key elements based on a second analysis involving second predetermined criteria; and presenting, via a display, the headline banner according to a first output of the first key element analysis and the summary according to a second output of the second key element analysis.

14. The computer usable program product of claim 13, wherein the stored program instructions are stored in a computer readable storage device in a data processing system, and wherein the stored program instructions are transferred over a network from a remote data processing system.

15. The computer usable program product of claim 13, wherein the stored program instructions are stored in a computer readable storage device in a server data processing system, and wherein the stored program instructions are downloaded over a network to a remote data processing system for use in a computer readable storage device associated with the remote data processing system, further comprising:

program instructions to meter use of the computer usable code associated with the request; and program instructions to generate an invoice based on the metered use.

16. A computer usable program product of claim 13, wherein the additional key words and key terms are associated with conversation data of the conversation thread generated over an amount of time selected based on a coherence score of the headline banner.

17. A computer usable program product of claim 13, wherein the summary includes a number of key elements determined based at least in part on a user preference.

18. A computer system comprising a processor and one or more computer readable storage media, and program instructions collectively stored on the one or more computer readable storage media, the program instructions executable by the processor to cause the processor to perform operations comprising:

dividing collected real-time conversation data of a conversation thread into a media component and a text component;

implementing a first machine learning mechanism to enhance a first topic modeling operation of the text component of the collected real-time conversation data to identify key words associated with the conversation thread;

implementing a second machine learning mechanism to enhance a second topic modeling operation of the media component of the collected real-time conversation data to identify key terms associated with the conversation thread;

combining the key words and key terms into a first group of key elements;

generating a headline banner from the first group of key elements, wherein the headline banner includes key elements selected from the first group of key elements based on a first analysis involving first predetermined criteria;

combining additional key words from the first machine learning mechanism and additional key terms from the second machine learning mechanism with the first group of key elements to form a second group of key elements;

generating a summary from the second group of key elements, wherein the summary includes key elements selected from the second group of key elements based on a second analysis involving second predetermined criteria; and presenting, via a display, the headline banner according to a first output of the first key element analysis and the summary according to a second output of the second key element analysis.

19. The computer system of claim 18, wherein the additional key words and key terms are associated with conversation data of the conversation thread generated over an amount of time selected based on a coherence score of the headline banner.

20. The computer system of claim 18, wherein the summary includes a number of key elements determined based at least in part on a user preference.

* * * * *